United States Patent Office 3,533,005

Patented Oct. 6, 1970

3,533,005
HIGHLY LINEAR GAIN-CONTROLLED VIDEO AMPLIFIER CIRCUIT

Ake W. Alm, San Pedro, Calif., assignor to Hughes Aircraft Company, Culver City, Calif., a corporation of Delaware Filed May 31, 1968, Ser. No. 733,534
Int. Cl. H03g *3/30*
U.S. Cl. 330—29 5 Claims

ABSTRACT OF THE DISCLOSURE

In the disclosed gain-controlled video amplifier circuit, a video amplifying portion includes two transistors having their emitter electrodes coupled to the collector electrode of a third transistor. A gain control portion includes an operational amplifier that produces a voltage indicative of the difference between a gain control input voltage and a voltage derived from the video amplifier portion. The difference voltage is fed back to the video amplifier portion to control the gain of the video amplifier portion.

This invention relates to electronic amplifiers, and more particularly it relates to a highly linear gain-controlled video amplifier circuit that insures the achievement of excellent linearity and increased dynamic range.

The invention herein described was made in the course of or under a contract with the United States Air Force.

Often a linear gain-controlled amplifier with a capability of high linearity over a large bandwidth and a large gain range is required. One example of a prior art gain-controlled amplifier is the circuit illustrated in FIG. 3, p. 71 of an article entitled "Try Diodes for Remote Gain Control" in "Electronic Design," Sept. 27, 1966. Such an amplifier employs an essentially three transistor amplifying circuit having the collector electrode of a first transistor coupled to the emitter electrodes of second and third transistors, the second and third transistors having their collector electrodes and their emitter electrodes coupled together. The amplifier input is coupled to the base of the first transistor, with an output being coupled to the base electrode of the third transistor. The gain of this amplifier varies substantially directly with the current into the collector electrode of the third transistor and varies substantially inversely with the collector-emitter current of the first transistor. The gain may be varied by increasing or decreasing the voltage applied to the base electrode of the first transistor, thereby increasing or decreasing the collector-emitter current of the first transistor. The changing of the voltage is achieved by potentiometers or other means. By changing the collector-emitter current of the first transistor, a substantially negatively sloped non-linear output voltage vs. control voltage characteristic results, because the gain varies inversely with the collector-emitter current of the first transistor. This limits the range of gain over which the amplifier may be effectively used.

Accordingly, it is an object of the present invention to provide a gain-controlled video amplifier having a highly linear gain as a function of an applied control voltage.

It is a further object of the present invention to provide a highly linear gain-controlled video amplifier that, in addition to possessing the foregoing advantages, is simple and compact in design and reliable in operation.

In accordance with the foregoing objects, a gain-controlled video amplifier circuit according to the invention comprises a video amplifier circuit portion that includes first, second and third transistors. The second and third transistors have their emitter electrodes coupled together; and these emitter electrodes are coupled to the collector electrode of the firss transistor. A power supply having a first terminal and a second terminal furnishes operating potentials for the first, second and third transistors. First and second resistors are coupled between the collector electrode of the third transistor and the first power supply terminal, the collector electrode of the second transistor also being coupled to the first power supply terminal. The second power supply terminal is coupled to the emitter electrode of the first transistor. A voltage input terminal is coupled to the base electrode of the first transistor, while an output terminal is coupled to the collector electrode of the third transistor. A gain control circuit portion includes a difference amplifier coupled in a gain control loop between the junction between the first and the sceond resistors and the base electrode of the third transistor. The gain control circuit portion includes means for applying a gain control input voltage to a terminal of the difference amplifier.

Other and further objects, advantages and characteristic features of the present invention will become readily apparent from the following detailed description of the invention when considered in conjunction with the accompanying drawing in which the sole figure is a schematic circuit diagram illustrating a preferred embodiment of the invention.

Referring to the figure with greater particularity, there is shown a circuit including a video amplifier circuit portion 39 and a gain control circuit portion 68 for applying a feedback signal to the video amplifier portion 39. The gain control portion 68 includes a difference amplifier for providing an output voltage indicative of the difference between a gain control input voltage to the difference amplifier and a voltage derived from the video amplifier circuit portion 39. The difference amplifier output voltage is fed back to the video amplifier portion 39 and is used to regulate the gain of the video amplifier portion 39.

In the video amplifier portion 39, a terminal 10, which receives a video input voltage, is coupled via DC blocking capacitor 12 to the base electrode of a transistor 14. The base electrode of transistor 14 is connected, via biasing resistor 16 and a series temperature compensating diode 18, to a terminal 20 to which may be applied a DC voltage of −15 volts, for example, from a suitable power supply (not shown). The emitter electrode of transistor 14 is connected to terminal 20 via biasing resistor 22. A biasing resistor 24 is connected between the base electrode of transistor 14 and a level of reference potential illustrated as ground.

The collector electrode of transistor 14 is connected to junction 25 between the emitter electrodes of transistors 26 and 28. By coupling the emitter and collector electrodes of transistors 26 and 28 together, the individual transistor non-linearities are substantially eliminated and a minimally temperature dependent amplifier output voltage results. The base electrode of transistor 26 is connected to ground. The collector electrode of transistor 26 is connected to a terminal 30 to which may be applied a DC voltage of +15 volts, for example, from a suitable power supply (not shown). The collector electrode of transistor 28 is connected, via series resistors 32 and 34, to terminal 30, resistor 32 being connected to the collector of transistor 28. A terminal 36 from which the amplified video output voltage from the amplifier may be obtained is coupld to the collector electrode of transitor 28 via a blocking capacitor 38.

In the gain control portion 68, an input terminal 42 of a control amplifier 44, which may be a difference amplifier, is connected via a resistor 40 to junction 45 between resistors 34 and 32. A feedback loop comprising capacitor 64 and resistor 62 is coupled between output terminal 54

Oct. 6, 1970 A. W. ALM 3,533,005
HIGHLY LINEAR GAIN-CONTROLLED VIDEO AMPLIFIER CIRCUIT
Filed May 31, 1968
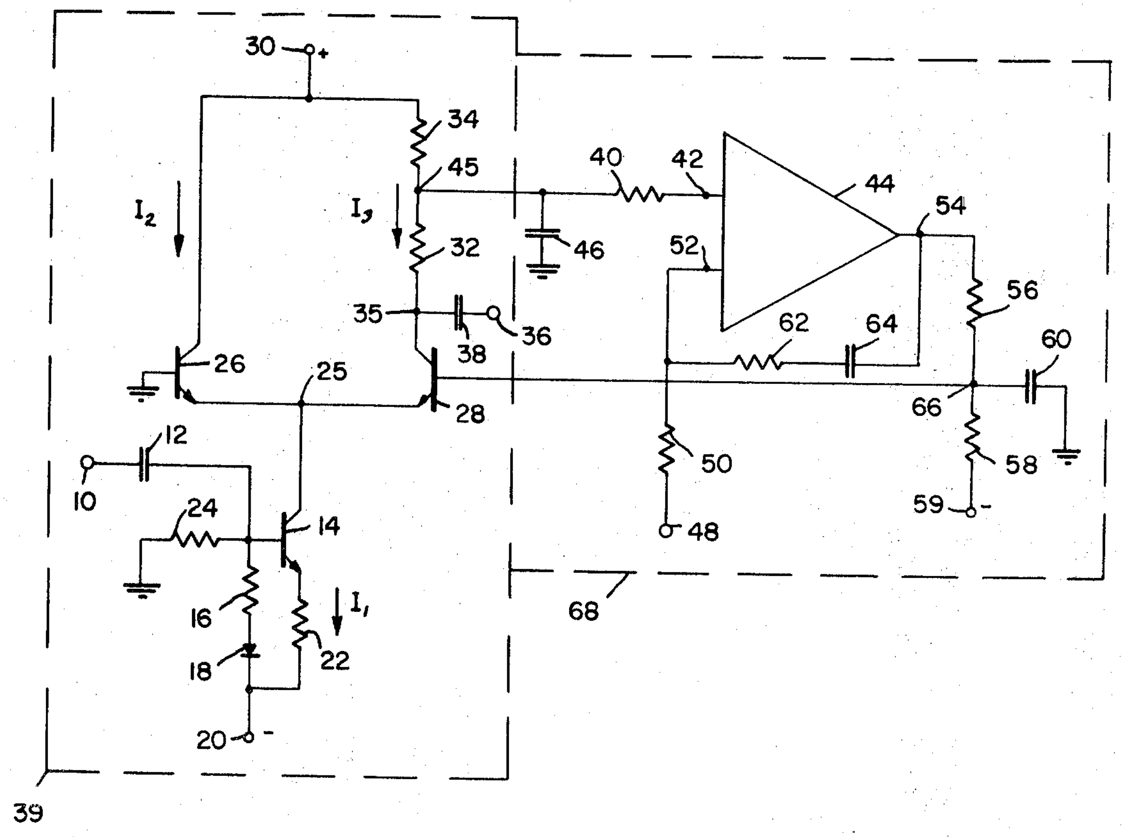
Ake W. Alm,
INVENTOR.
BY.
Paul M. Coble
ATTORNEY.

second and third transistors being coupled to the collector electrode of said first transistor, power supply means having a first terminal and a second terminal for furnishing an operating potential for said first, second and third transistors, first and second series resistors coupled between the collector electrode of said third transistor and said first terminal, the collector electrode of said second transistor being coupled to said first terminal, said second terminal being coupled to the emitter electrode of said first transistor, a voltage input terminal coupled to the base electrode of said first transistor, and an output terminal coupled to the collector electrode of said third transistor; and a gain control circuit portion including a difference amplifier coupled in a gain control loop between the junction between said first and said second resistors and the base electrode of said third transistor, and means for applying a gain control voltage to a terminal of said difference amplifier.

2. A gain-controlled video amplifier circuit comprising:

a video amplifier circuit portion including first, second and third transistors, the emitter electrodes of said second and third transistors being coupled to the collector electrode of said first transistor, power supply means having a first terminal and a second terminal for furnishing an opetrating potential for said first, second and third transistors, first and second series resistors coupled between the collector electrode of said third transistor and said first terminal, the collector electrode of said second transistor being coupled to said first terminal, said second terminal being coupled to the emitter electrode of said first transistor, a voltage input terminal coupled to the base electrode of said first transistor, and an output terminal coupled to the collector electrode of said third transistor; and gain control difference amplifier means for providing a feedback voltage indicative of the difference between a gain control voltage and the voltage at the junction between said first and second resistors and for applying said feedback voltage to the base electrode of said third transistor.

3. A gain-controlled video amplifier circuit comprising:

a video amplifier circuit portion including first, second and third transistors, the emitter electrodes of said second and third transistors being coupled to the collector electrode of said first transistor, power supply means having a first terminal and a second terminal for furnishing an operating potential for said first, second and third transistors, first and second series resistors coupled between the collector electrode of said third transistor and said first terminal, the collector electrode of said second transistor being coupled to said first terminal, said second terminal being coupled to the emitter electrode of said first transistor, a voltage input terminal coupled to the base electrode of said first transistor, and an output terminal coupled to the collector electrode of said third transistor; and a gain control circuit portion including an operational amplifier having an input terminal, a gain control terminal and an output terminal, said output terminal being coupled to the base electrode of said third transistor, said input terminal being coupled to the junction between said first and said second resistors.

4. A gain-controlled video amplifier circuit according to claim 3 wherein said operational amplifier includes a difference amplifier and a feedback circuit, said feedback circuit including a third resistor and a first capacitor coupled in series between said gain control terminal and said output terminal of said operational amplifier.

5. A gain-controlled video amplifier circuit comprising:

a video amplifier circuit portion including first, second and third transistors, the emitter electrodes of said second and third transistors being coupled to the collector electrode of said first transistor, power supply means having a first terminal and a second terminal for furnishing an operating potential for said first, second and third transistors, first and second series resistors coupled between the collector electrode of said third transistor and said first terminal, the collector electrode of said second transistor being coupled to said first terminal, said second terminal being coupled to the emitter electrode of said first transistor, a voltage input terminal coupled to the base electrode of said first transistor, and an output terminal coupled to the collector electrode of said third transistor; and a gain-control circuit portion including a difference amplifier having an input terminal, a gain control terminal and an output terminal, said input terminal being coupled to the junction between said first and said second series resistors, third and fourth series resistors coupled between said output terminal and a terminal of said power supply means, the base electrode of said third transistor being coupled to the junction between said third and said fourth resistors, a fifth resistor and a first capacitor coupled in series between said output terminal and said gain control terminal, a second capacitor coupled between the junction of said first and second resistors and another terminal of said power supply means, a third capacitor coupled between the junction between said third and said fourth resistors and said another terminal.

References Cited

UNITED STATES PATENTS 3,210,683 10/1965 Pay.

ROY LAKE, Primary Examiner

J. B. MULLINS, Assistant Examiner

U.S. Cl. X.R.

330—20, 30.